United States Patent [19]
Calabrese et al.

[11] Patent Number: 6,055,423
[45] Date of Patent: Apr. 25, 2000

[54] METHOD FOR UPDATING MESSAGE WAITING NUMBER COUNT FOR A MOBILE TELEPHONE IN AN ANSI41 NETWORK

[75] Inventors: Robert T. Calabrese; Bernard L. Cyr, both of Naperville, Ill.

[73] Assignee: Lucent Technologies, Inc., Murray Hill, N.J.

[21] Appl. No.: 08/999,012

[22] Filed: Dec. 29, 1997

[51] Int. Cl.[7] .................................................. H04Q 7/30
[52] U.S. Cl. ...................... 455/412; 455/466; 455/461; 455/435
[58] Field of Search ................................. 455/412, 466, 455/461, 435, 433

[56] References Cited

U.S. PATENT DOCUMENTS

| | | |
|---|---|---|
| 5,627,877 | 5/1997 | Penttonen ............................. 455/33.1 |
| 5,682,600 | 10/1997 | Salin .................................... 455/33.1 |
| 5,768,509 | 6/1998 | Gunluk ............................. 395/200.33 |
| 5,802,466 | 9/1998 | Gallant et al. ........................ 455/413 |
| 5,901,359 | 5/1999 | Malmstrom .......................... 455/461 |
| 5,903,726 | 5/1999 | Donovan et al. ................ 395/200.36 |

*Primary Examiner*—Daniel S. Hunter
*Assistant Examiner*—Alan Gantt

[57] ABSTRACT

A method is provided for updating a message waiting notification count in a profile of a mobile telephone in an ANSI41 environment. An information directive, a message defined by the ANSI41 standard is modified to included the message waiting notification count, a parameter defined by the ANSI41 standard. The updates to the message waiting notification count are transmitted from a voice mail system node to a home location register by the modified information directive without the use of dedicated connections and proprietary interfaces.

9 Claims, 3 Drawing Sheets

| MODIFIED INFORMATION DIRECTIVE | TYPE | ANSI REFERENCE | NOTES |
|---|---|---|---|
| ELECTRONIC SERIAL NUMBER (ESN) | MANDATORY | 6.5.2.63 | AN INDICATOR FOR THE ELECTRONIC SERIAL NUMBER MUST BE USED, EITHER THE ACTUAL SERIAL NUMBER OR ALL ZEROES |
| MOBILE IDENTIFICATION NUMBER (MIN) | MANDATORY | 6.5.2.81 | CORRECT MOBILE IDENTIFICATION NUMBER IS REQUIRED |
| MESSAGE WAITING NOTIFICATION COUNT (MWNC) | OPTIONAL | 6.5.2.78 | THIS OPTIONAL PARAMETER REPRESENTS THE MESSAGE WAITING NUMBER COUNT FOR THE SUBSCRIBER |
| INFORMATION DIRECTIVE RETURN RESULT | | | |
| EMPTY | | | THE RETURN RESULT CONFIRMS THE RECEIPT OF THE INFORMATION DIRECTIVE BY THE HLR BUT DOES NOT CONFIRM THE DISPLAY OF MWNC AT THE MOBILE TELEPHONE |

FIG. 3

METHOD FOR UPDATING MESSAGE WAITING NUMBER COUNT FOR A MOBILE TELEPHONE IN AN ANSI41 NETWORK

BACKGROUND OF INVENTION

This invention pertains to use of the ANSI 41 standard to update the status of the message waiting notification count (MWNC) for a mobile telephone.

Mobile communications in the telephony industry comply with ANSI41 which is the industry standard for cellular radio communications intersystem operations. The ANSI41 standard is adopted and recognized by the American National Standards Institute and is published by the Telecommunications Industry Association/Electronics Industry Association TR-45.2 subcommittee, the disclosure of which is hereby incorporated by reference.

In the ANSI41 standard, a home location register (HLR) is a network node which maintains a profile for the mobile telephone of a subscriber. The profile includes information such as the account status and features of the mobile telephone of a subscriber. The ANSI41 standard defines an ANSI41 interface between the HLR and other nodes within the mobile communication network.

As seen in FIG. 1, an exemplary prior art network 10 defined by the ANSI41 standard includes a HLR 12, a mobile switch center (MSC) 14 which performs the mobile phone call processing, and a visited switch system (VLR)16 which receives profile updates from the HLR 12. The HLR12, the MSC 14 and the VLR 16 are nodes defined by the ANSI41 standard. Interfaces IA18 and IB20 are interfaces defined by the ANSI41 standard. Interface IA18 connects MSC 14 with HLR 12, and interface IB20 connects VLR 16 with HLR 12. Other nodes and interfaces, not shown, are used in accordance with the ANSI41 standard.

The HLR 12 provides an update to the VLR 16 for the mobile telephone 21. Information concerning the profile of the mobile telephone of the subscriber is transferred to the VLR 16 in accordance with the ANSI41 standard by a message such as the qualification directive message including a waiting notification count (MWNC) parameter. Information pertaining to the profile of the mobile telephone is transferred from the HLR 12 to the VLR 16 in accordance with the ANSI41 standard during a registration process.

Disadvantageously, in the existing practice of the ANSI41 standard no provision is made for providing an ANSI41 interface between a voice mail system (VMS) 22 and the HLR12. The status of MWNC in existing mobile telephone networks is provided, as shown in FIG. 1, by a dedicated connection 24, such as a dual tone multi frequency trunk (DTMF) with a proprietary interface (PI) 26 between the VMS 22 and the HLR 12. This arrangement involves the cost of establishing dedicated connections and proprietary interfaces. These proprietary interfaces prevent the ease of providing message waiting updates to the HLR 12 via an ANSI41 interface such as occurs when multiple vendors wish to launch updates to the HLR 12 for fax, voice and short messages, for example. Each voice mail system vendor in the prior art is required to establish its own propriety interface and connections between the VMS 22 and HLR 12.

Further, since the qualification directive can modify more than the MWNC of a subscriber's profile, it is not desirable to make the qualification directive available at a voice mail system. In fact, launching a message from VMS 22 to an HLR 12 is not permitted in current mobile telephony practice.

The present invention is directed to overcoming the affects of the problems set forth above.

SUMMARY OF THE INVENTION

The problems noted above are solved in accordance with the invention, by a method of updating the message waiting number count for a mobile telephone. The method determines when there is a change in the message waiting number count, selects a message defined by the ANSI41 standard and adds to the selected message or modifies the selected message to include a parameter defined by the ANSI41 standard representing the change in the message waiting notification count.

In accordance with another aspect of the invention, the selected message only includes the updated message waiting notification count of the profile of the mobile telephone and communicates the updated message waiting notification count between the two nodes in the network which are a VMS and HLR defined by the ANSI41 standard. The method further provides for confirming receipt by the HLR of the message waiting notification count transmitted to the HLR from the VMS.

In yet another aspect of the method of the invention, included in the selected message is an electronic serial number indicator which is the actual electronic serial number or zeroes, and a mobile identification number for the mobile phone.

These and other features and advantages of the present invention will become apparent from the following detailed description, the accompanying drawings and the appended claims.

BRIEF DESCRIPTION OF THE DRAWINGS

FIG. 3 shows a Table 1 describing a modified information directive of the ANSI41 standard in accordance with the invention.

DESCRIPTION OF THE INVENTION

Figure 1:
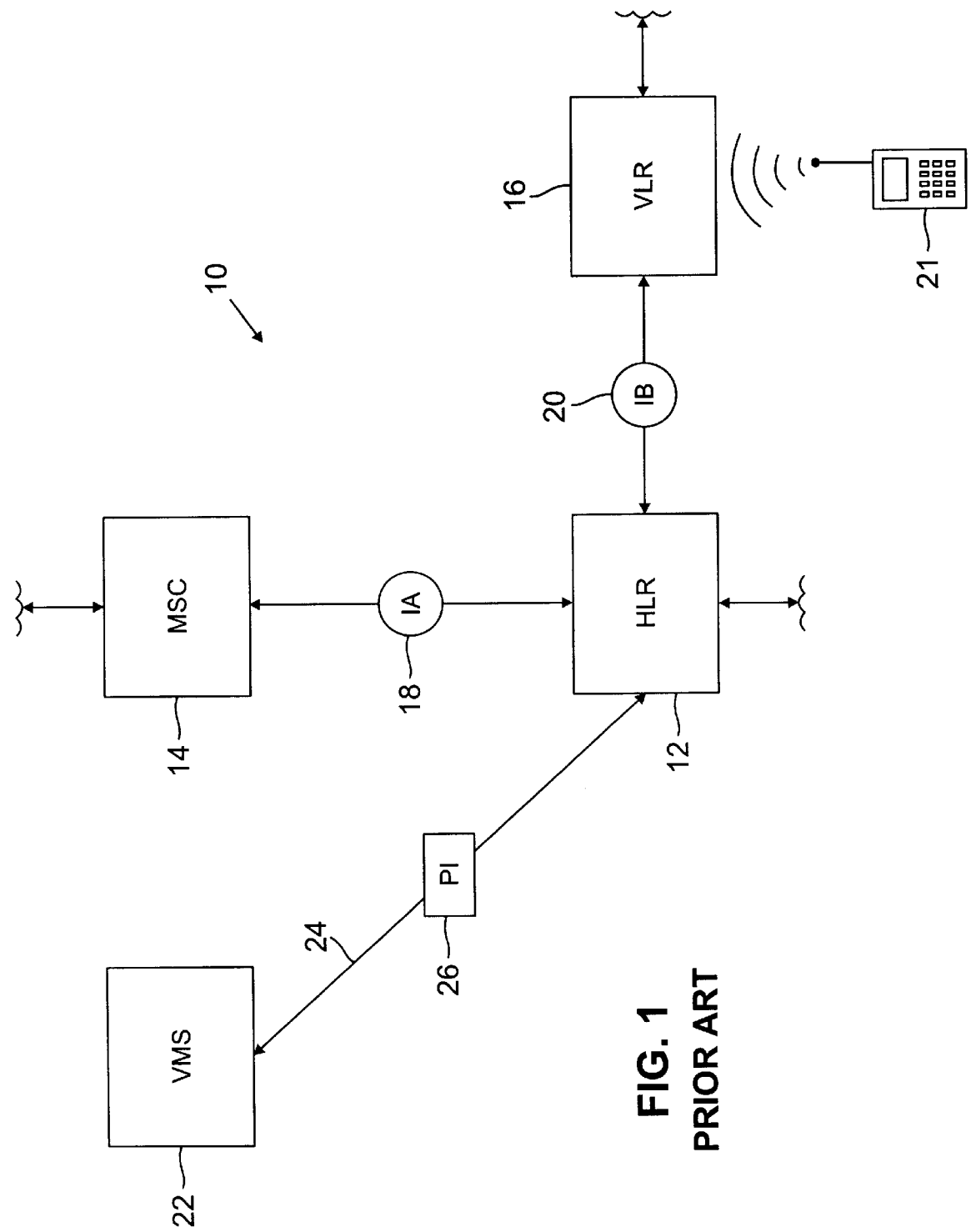
FIG. 1 shows a block diagram of a prior art network of nodes existing in accordance with the ANSI41 standard environment.
Figure 2:
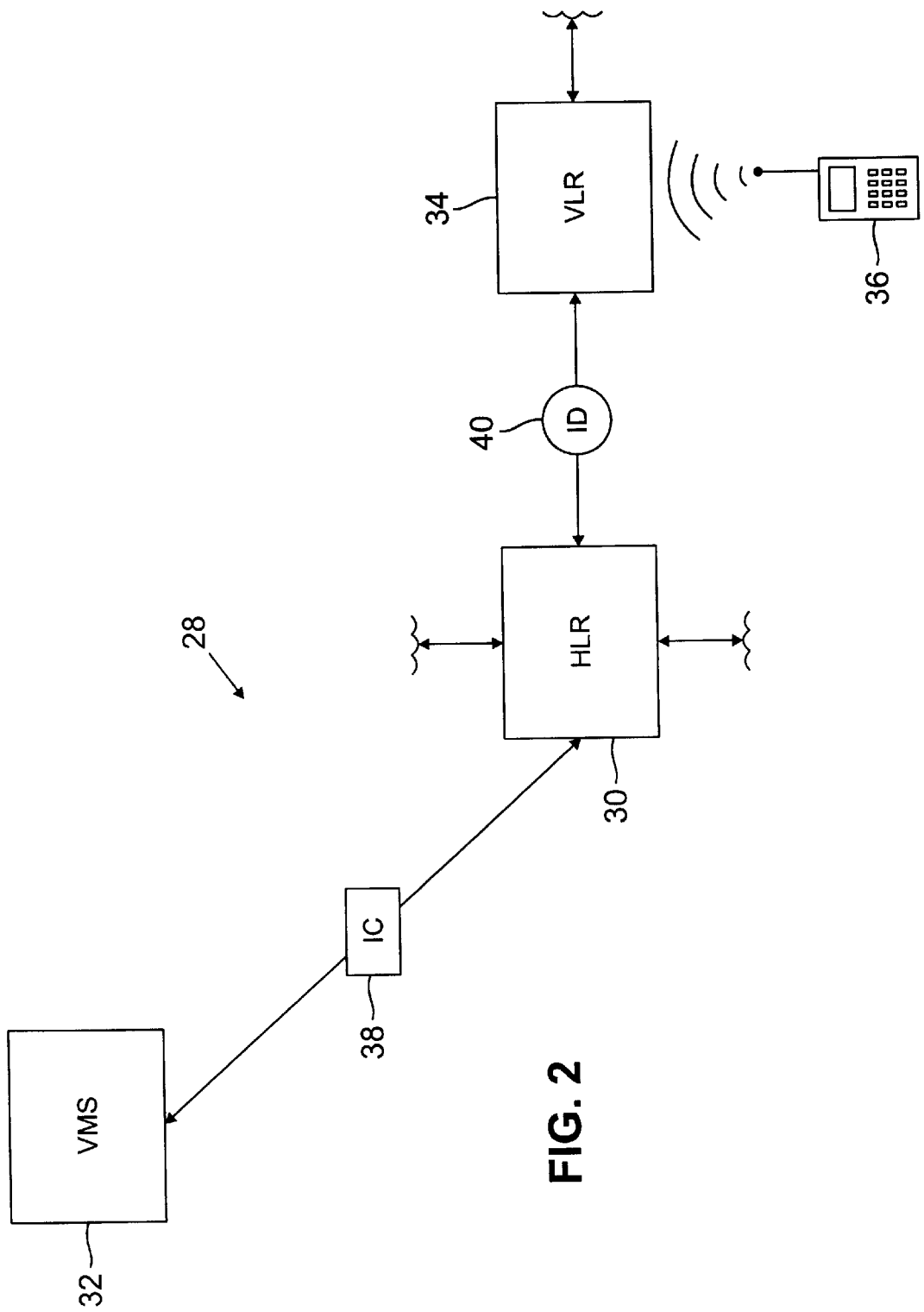
FIG. 2 shows a block diagram of a network of nodes existing in accordance with the ANSI41 standard that is utilized in the method of the invention.

FIG. 2 shows a network 28 in accordance with the invention. The network includes a HLR 30, a VMS 32 and a VLR 34. The VMS 32 updates the HLR 30 with the status of the MWNC for a mobile telephone 36. The VLR 34 receives profile updates from the HLR 30 for the mobile telephone 36. The HLR 30 and VMS 32 are connected by an interface IC 38, and the HLR 30 and the VLR 34 are connected by an interface ID 40.

In the ANSI41 standard, an information directive message is defined including two mandatory parameters, an electronic serial number and a mobile identification number and optional parameters. The information directive also includes optional parameters. The information directive, electronic serial number, and mobile identification number are defined by ANSI41 reference number 6.4.2.22, 6.5.2.63 and 6.5.2.81, respectively, the disclosures of which are hereby incorporated by reference.

The ANSI41 standard includes a message waiting notification count (MWNC), which is a parameter in accordance with the ANSI41 standard defined by ANSI41 reference number 6.5.2.78, the disclosure of which is hereby incorporated by reference. The information directive of the ANSI41 standard does not include the MWNC as an optional parameter of the optional parameter listed in the information directive message.

FIG. 3 shows a Table 1 describing a modified information directive 42 in accordance with the invention. As shown in FIG. 2, the modified information directive 42 comprises the interface IC 38 between the HLR 30 and the VMS 32.

Referring to FIG. 3, the modified information directive 42 includes two mandatory parameters, an electronic serial number 44 and a mobile identification number 46. The electronic serial number 44 does not need to be provisioned by the VMS 32. However, if not provisioned, zeros must be used to avoid an error message because of a failure to match the database of HLR 30. Thus, in accordance with the invention, an indicator of the electronic serial number must be provided if the HLR 30 is to receive the information directive from the VMS 32.

In accordance with the in invention, as shown in FIG. 3, a message waiting number count (MWNC) 48 is included as an optional parameter in the modified information directive 42.

The modified information directive 42, unlike the qualification directive, is unable to modify the profile of the mobile telephone, except to update the MWNC. Thus the modified information directive 42 in accordance with the invention is suitable for use by voice mail system vendors to send or launch updates to the MWNC from the VMS 32 to the HLR 30 without the risk of unauthorized modifications to the profile of the mobile telephone 36.

In the operation of the network 28 in accordance with the invention, voice mail is left at the subscriber's VMS 32. The VMS 32 formats and transmits the modified information directive 42 including the ESN 44, the MIN 46, and the MWNC 48 to the subscriber's HLR 30. In accordance with the invention, the profile of the mobile telephone 36 is updated at HLR 30 with the modified information directive 42 using a message, the information directive, and parameters, message waiting notification count, in a way not defined or suggested by the ANSI41 standard.

Those skilled in the art who now have the benefit of the present disclosure will appreciate that the present invention may take many forms and embodiments. Some embodiments have been presented so as to give an understanding of the invention. It is intended that these embodiments should be illustrative, and not limiting the present invention. Rather, it is intended that the invention cover all modifications, equivalents and alternatives falling within the scope of the invention as defined by the appended claims.

What is claimed is:

1. A method for updating a message waiting notification count in a profile of a mobile telephone between a VMS node and a HLR node in a network defined by the ANSI41 standard, comprising the steps of:

determining when there is a change in the message waiting number count;

establishing a message which is an information directive defined by the ANSI41 standard which only includes the updated message waiting number count of the profile of the mobile telephone; and communicating the updated message waiting notification count between the VMS node and HLR node in the network.

2. The method of claim 1 including the step of confirming receipt by the HLR of the message waiting notification count.

3. The method of claim 1 wherein the step of establishing a message includes the step of including with the message a parameter for providing the message waiting notification count.

4. The method of claim 3 wherein the parameter is a message waiting notification count defined by the ANSI41 standard.

5. A method for updating the message waiting notification count for a mobile telephone from a VMS to a HLR in an ANSI41 environment, comprising the steps of:

determining when there is a change of the message waiting notification count;

selecting a message which is an information directive defined by the ANSI41 standard;

modifying the selected message to include the updated message waiting notification count; and transmitting the selected message from the VMS to the HLR.

6. The method of claim 5 wherein the step of selecting a message includes the step of including in the selected message an electronic serial number indicator and a mobile identification number for the mobile phone.

7. The method of claim 6 wherein the electronic serial number is at least one of the actual electronic serial number of the mobile telephone and zeroes.

8. The method of claim 5 wherein the step of modifying the selected message includes the step of adding a parameter to the selected message to provide the message waiting notification count.

9. The method of claim 8 wherein the parameter is a message waiting number count defined by the ANSI41 standard.

* * * * *

UNITED STATES PATENT AND TRADEMARK OFFICE
CERTIFICATE OF CORRECTION

PATENT NO. : 6,055,423
DATED : April 25, 2000
INVENTOR(S) : Calabrese et al.

It is certified that error appears in the above-identified patent and that said Letters Patent is hereby corrected as shown below:

In claim 9, line 2, delete "number" and insert --notification--.

Signed and Sealed this

Twenty-second Day of May, 2001

*Attest:*

NICHOLAS P. GODICI

*Attesting Officer*          *Acting Director of the United States Patent and Trademark Office*